April 3, 1945.   G. A. BJÖRKLUND ET AL   2,372,879
GAUGING DEVICE
Filed Dec. 26, 1941    4 Sheets-Sheet 3

Inventors:-
Gustaf Adolf Björklund
Hilding Valdemar Törnebohm

Patented Apr. 3, 1945

2,372,879

UNITED STATES PATENT OFFICE 2,372,879

GAUGING DEVICE

Gustaf Adolf Björklund and Hilding Valdemar Törnebohm, Goteborg, Sweden, assignors to SKF Industries, Inc., Philadelphia, Pa., a corporation of Delaware Application December 26, 1941, Serial No. 424,531
In Sweden March 12, 1941

3 Claims. (Cl. 33—147)

When great accuracy is required in checking and gauging the dimensions of work pieces, special gauging instruments, such as dial indicators, minimeters and the like are used. The gauging instrument is often mounted on a base which also serves to provide a support for the work. The base, the gauging instrument and the support together form a gauging device. In such devices as hitherto known the contact finger of the device has as a rule come into direct contact with the work piece.

According to the present invention a gauging contact separate from the contact finger and a separate movable connecting member between the gauging contact and the contact finger is used, the connecting member being guided in its movement and having greater travel than the field covered by the gauging instrument.

This device facilitates and simplifies a great number of different gauging operations, for instance internal gauging, since it permits a suitable form of gauging contact to be used for each gauging operation without reference to the shape and position of the gauging instrument itself. Further it will be possible to adjust the gauging instrument in such a manner that it will be actuated only after a certain amount of free movement on the part of the connecting member. In this manner it is possible to gauge directly parts which were not accessible for gauging with the gauging devices of previously known type. Further it is possible to avoid injuring sensitive instruments when locating the work piece on the support, especially when the dimensions of the work piece are greater than the gauging field of the instrument.

Further advantages of the invention will be apparent from the following and from the accompanying drawings which show two embodiments of the invention.

Figure 1:
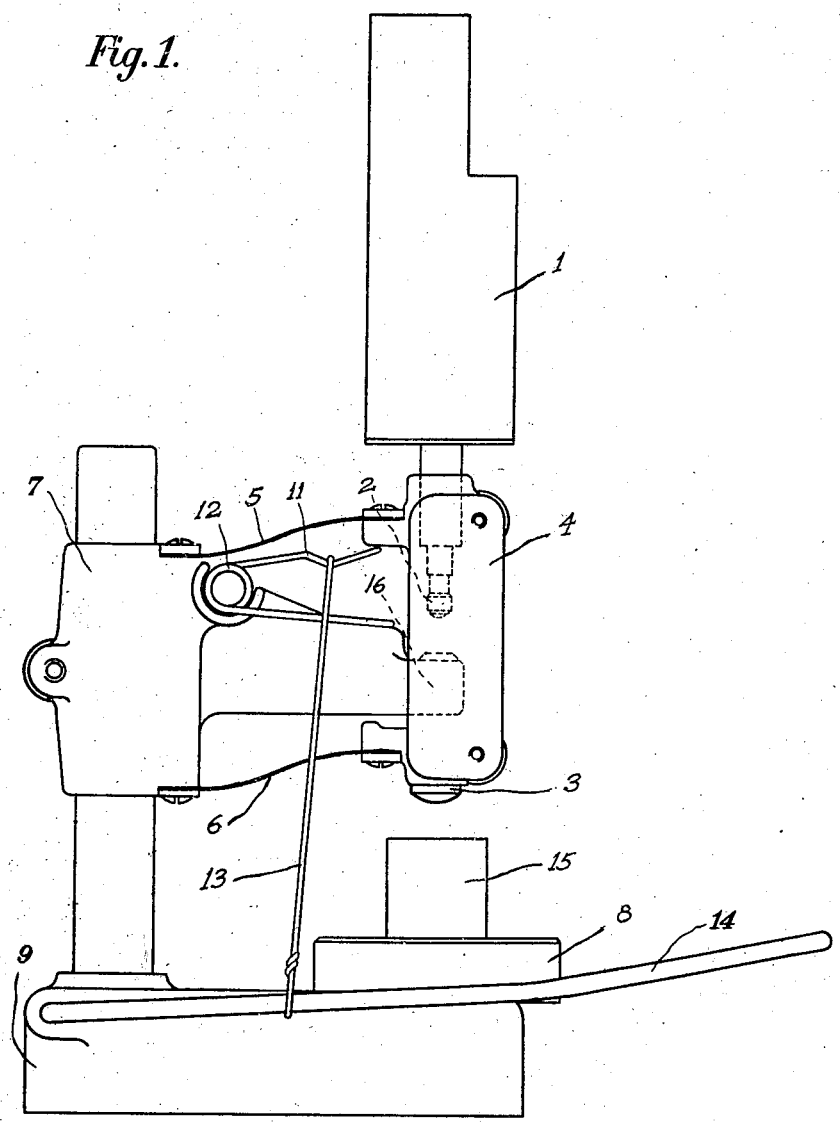
Figure 2:
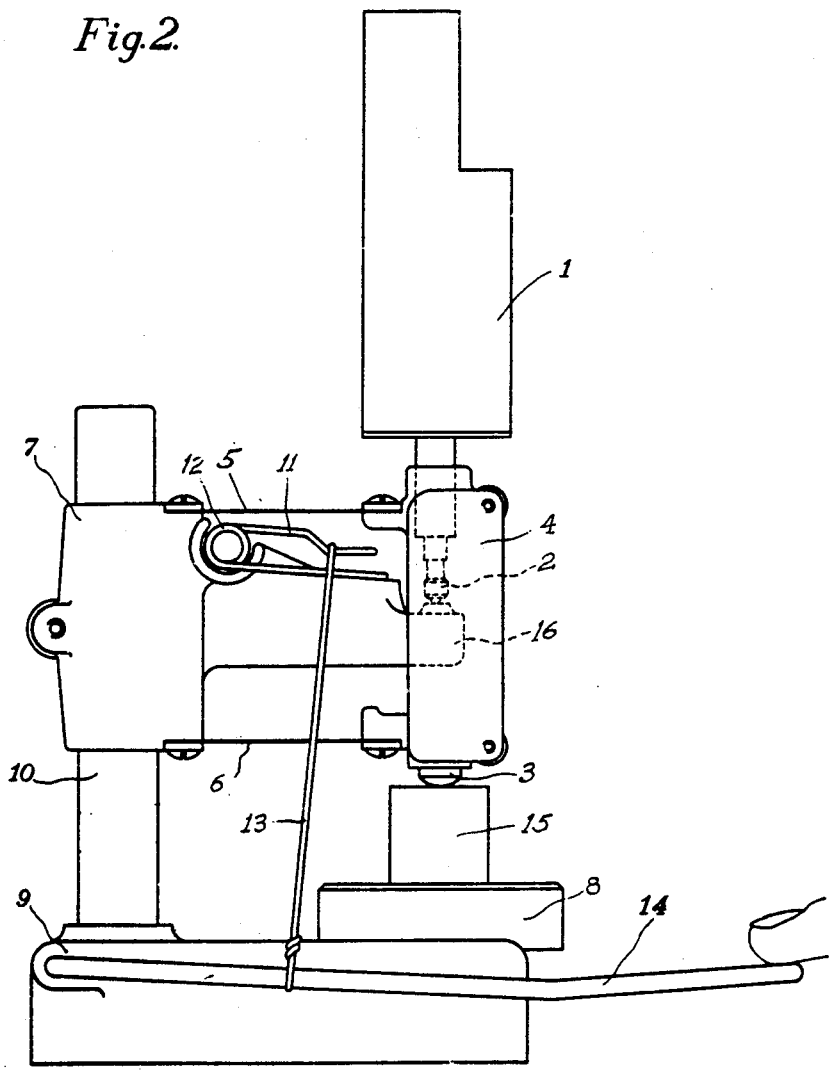
Figure 3:
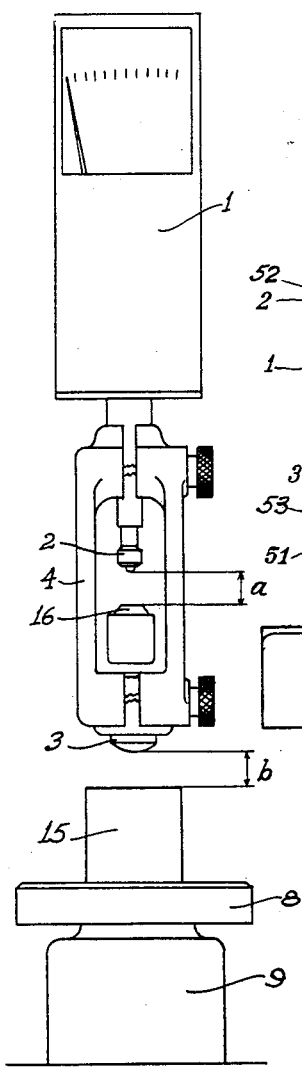
Figure 4:
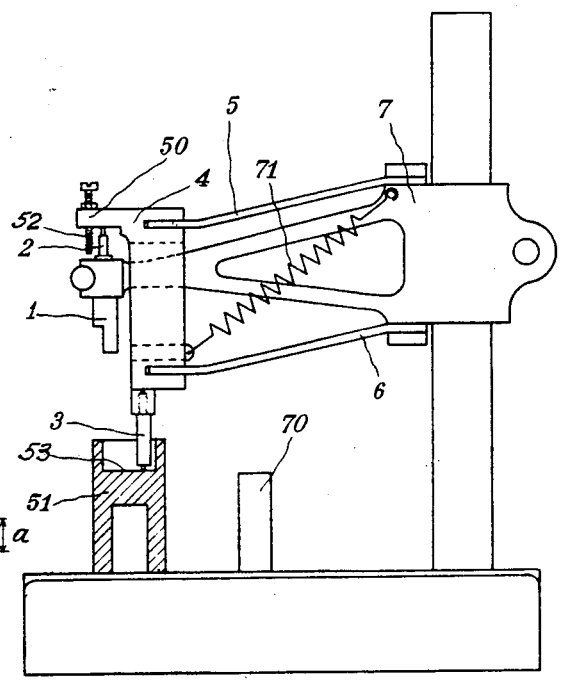
Figure 5:
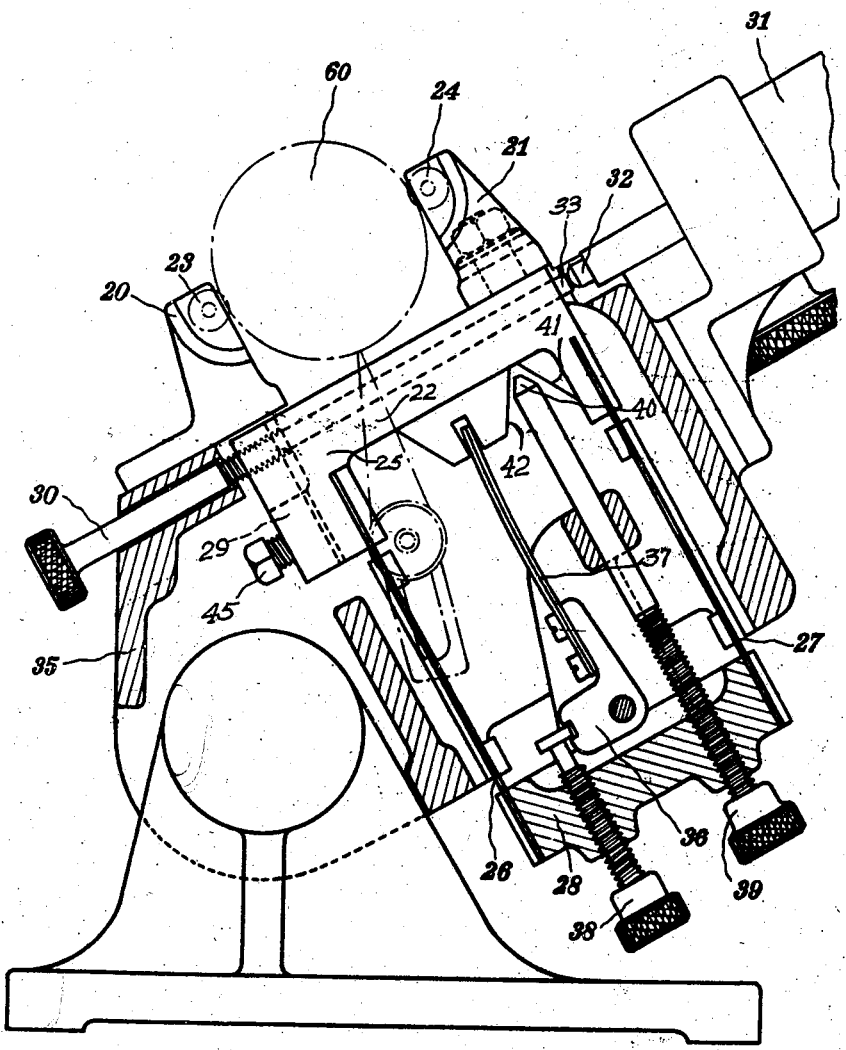

Figs. 1 and 2 show a side view of a device according to the invention with the connecting member in two different positions, and Fig. 3 shows certain of the parts seen from a direction perpendicular to that of Figs. 1 and 2. Fig. 4 shows a side view of a modification of the device according to Figs. 1-4. Fig. 5 shows a section through a device for gauging threads.

In the embodiment illustrated in Figs. 1-3 the gauging instrument comprises an indicator 1 having a contact finger 2 and a gauging member comprising a gauging contact 3. Both the indicator 1 and the contact 3 are carried by a connecting member 4 which is movably connected to a head 7 by means of two parallel leaf springs 5 and 6. The work piece 15 to be gauged is located on a table 8 under the gauging contact 3 carried by the base 9, to which is attached an upright 10 carrying the head 7.

The two parallel leaf springs 5 and 6 guide the connecting member 4 so that it is always kept parallel with its original position. The springs 5 and 6 however are too weak to support the weight of the connecting member 4 and the indicator 1, and these parts are therefore supported by one of the arms 11 of a spring 12 mounted on the head 7. The arm 11 is connected by a link 13 to a lever 14 pivotably connected to the base 9. By depressing the lever 14 the arm 11 is lowered, and the connecting member 4 and the indicator 1 follow the downward movement due to their own weight.

When not in operation, the connecting member assumes the position shown in Figs. 1 and 3. In this position the gauging contact 3 is located at a safe distance above the table 8 so that a work piece 15 can be freely placed on the table 8 without coming into contact with the gauging member. When a gauging operation is to take place, the lever 14 is depressed so that the connecting member 4 is lowered. Since both the indicator and the gauging contact 3 are connected to the connecting member 4, they take part in the downward movement of the connecting member. The gauging member 3 approaches the work piece 15 while the contact finger 2 approaches a contact surface 16 which is formed on the head 7, and which is therefore immovable and located in the path of the contact finger 2. Since the distance $a$ (Fig. 3) between the contact finger 2 and the contact surface 16 is somewhat less than the distance $b$ between the gauging contact 3 and the work piece 15, the contact finger 2 will first come into contact with the contact surface 16 upon which the indicator 1 will be actuated. Upon further lowering of the connecting member 4 the gauging contact 3 will finally come into contact with the work piece 15 which prevents all further lowering of the connecting member. The reading of the instrument will depend upon the magnitude of the movement after the contact finger 2 has come into engagement with the contact surface 16. The indicator therefore shows the relative dimension of the work piece as compared to a normal or standard dimension.

The gauging pressure will be the result of the weight of the connecting member 4 and the indicator 1 plus or minus the pressure of the leaf springs 5 and 6, depending upon whether the springs press downwards or upwards in the gauging position of the connecting member. The gauging pressure will therefore be entirely independent of the hand pressure. If it is desired to alter the gauging pressure, the head 7 is moved upwards or downwards on the upright 10, whereby the direction and magnitude of the pressure of the springs 5 and 6 can be altered. In this manner the position of the contact surface 16 is altered and this can be compensated for either by raising or lowering the instrument 1 relative to the connecting member 4 or by changing the table 8. An alteration of the gauging field of the apparatus can be accomplished by changing the position of the head 7 on the upright 10 by raising or lowering this instrument or by changing the table 8.

The gauging apparatus shown in Figs. 1–3 can be modified in the manner shown in Fig. 4. This modification differs from that shown in Figs. 1–3 mainly in that the gauging instrument 1 is mounted on the head 7 and has its contact finger 2 directed upwardly. When the connecting member 4 which is carried by leaf springs 5 and 6 is depressed through the action of certain members not illustrated against the action of a spring 71, the extending part 50 of the connecting member comes into contact with the contact finger 2. Shortly afterwards the gauging contact 3 contacts with the work piece 51 (shown in section) whereby the height of the surface 53 of the work piece relative to a certain standard height 70 can be read on the indicator 1. A screw 52 is provided on the extending part 50 of the connecting member in order to limit the travel of the connecting member. The work piece shown is of such shape that there would be some difficulty in bringing the surface 53 of the work piece into direct contact with the contact finger of a stationary gauging instrument. In a gauging device according to the invention the connecting member permits sufficient movement of the gauging contact 3 in order to bring this member into contact with the surface 53 of the work piece only shortly after the instrument 1 is brought into action.

Fig. 5 shows a device for gauging threads made according to the invention. The work piece 60 is placed between two gauging member brackets 20, 21 and rests on one or more supports 22, adjustably mounted on the sides of the frame 35. The brackets 20, 21 are provided with rolls 23, 24, intended to engage the threads of the work piece. The bracket 20 is mounted in fixed position relative to the frame 35, while the bracket 21 is movable. The bracket 21 is screwed to a block 25 which by means of two parallel leaf springs 26, 27, is movably connected to a head 28 which is screwed into the frame 35. In order to connect the block 25 and the bracket 21 in the desired position, there is a dove-tailed longitudinal groove (not shown) in the block 25.

The device is provided with means for exerting a spring pressure in either direction on the block 25. This means comprises an angle lever 36 pivotably attached to the head 28, and a leaf spring 37 attached to the angle lever 36 and engaging a groove in the block 25. A screw 38 screwed into the head 28 engages a groove in the angle lever 36. By means of the screw 38 it is possible to turn the angle lever in the desired direction and thereby cause the spring 37 to press against the block 25 in the desired direction. In this manner it is possible to cause the apparatus to exert a gauging pressure of desired magnitude and in the desired direction.

In order to limit the movement of the block 25 a screw 39 is screwed into a threaded hole in the head 28 and has a conical end 40 projecting between two slanting surfaces 41, 42 on the block 25. The farther in the screw 39 is screwed, the shorter will be the movement which is permitted to the block 25. In the screw 39 is screwed in until it comes into contact with both of the slanting surfaces on the block 25, all movement of the block 25 is prevented which is of advantage when transporting the device.

The head 28, the block 25 and the springs 26, 27, together with other parts attached to the head together form a separate unit which can be detached from the frame of the apparatus.

At one end of the block 25 a plate 29 is attached by means of a dove-tailed groove and is retained by means of a screw 45. A screw 30 is screwed through a threaded hole in the plate 29 and extends through the previously mentioned dove-tailed groove in the block. The gauging instrument comprises an indicator 31 mounted on the frame and having a contact finger 32 in line with the screw 30.

When a work piece 60 is to be gauged, the screw 30 is as a rule screwed out so that there is a certain amount of play between the end 33 of the screw 30 and the contact finger 32. The work piece 60 is pushed down between the gauging member brackets 20, 21. The bracket 21 then moves carrying along with it the block 25 upwards towards the right in Fig. 5. The screw 30 is carried along in this movement, and its end comes into contact with the contact finger 32 as was described in connection with Fig. 3, and upon continued movement the indicator is actuated. By introducing a standard piece with desired dimensions between the gauging rolls and thereafter adjusting the screw 30, the apparatus is adjusted for gauging a certain kind of threaded work pieces. When using such work pieces the device gives a relative reading referred to the dimension of the standard piece. By rotating the work between the gauging rolls the work is checked as regards roundness.

The block 25 serves during the gauging operation as a connecting member between the bracket 21 and the contact finger 32 of the indicator. The leaf springs guide the block so that it is always parallel with its original position, and the movement of the bracket is therefore accurately transferred to the contact finger.

The thread gauging apparatus described above can also be used for gauging internal threads. The brackets 20, 21 shown in the drawing are then replaced by brackets formed in some other suitable manner, and the angle lever is adjusted by means of the screw 38 so that the spring 37 exerts a pressure toward the right in Fig. 5 on the block 25 instead of toward the left as illustrated.

The invention is not limited to the embodiments illustrated in the drawings, but can be modified in many ways. For instance the device shown in Fig. 1 can be altered so that the connecting member is horizontally movable, whereby the influence of the force of gravity on the connecting member is replaced by a spring pressure opposed to and weaker than that of the spring 12.

Having thus described our invention, we claim and desire to secure by Letters Patent the following:

1. A gauging device comprising a gauging instrument having a contact finger, a gauging contact separate from the said contact finger, a movable connecting member disposed between the gauging contact and the gauging instrument, the said connecting member having a greater travel than the gauging field of the instrument, the said contact finger being movable in the direction of movement of the connecting member, the gauging contact and the instrument being mounted on and movable with the connecting member, and a contact in the path of the contact finger and spaced therefrom for engaging the contact finger and actuating the gauging instrument only after a certain amount of movement of the connecting member has take place, spring means for maintaining the connecting member in raised position and manually operable means for overcoming the pressure of the said spring means to permit of the lowering of the connecting member.

2. A gauging device comprising a gauging instrument having a contact finger, a gauging contact separate from the said contact finger, a head and a support for said head, a movable connecting member disposed between the gauging contact and the gauging instrument, the gauging contact and the instrument being mounted on the connecting member, a pair of substantially parallel leaf springs connecting the connecting member to the head, the stiffness of the said leaf springs being insufficient for retaining the connecting member and the members attached thereto in raised position, a third spring for retaining the connecting member in the extreme upper position and manually operable means for overcoming the upward pressure of the third spring upon the connecting member, the contact finger being movable in the direction of movement of the connecting member, a contact in the path of the contact finger and spaced therefrom for engaging the contact finger and actuating the gauging instrument only after a certain amount of movement of the connecting member has taken place.

3. A gauging device comprising a gauging instrument having a contact finger, a movable member having a greater travel than the gauging field of the instrument, a gauging contact separate from said contact finger and movable with said member into contact with the work, spring means for normally maintaining said member in a retracted position with respect to the work, a relatively fixed member, said instrument being mounted on one of said members and the other of said members having a part arranged for actuating engagement with said contact finger when the movable member is advanced to bring the gauging contact against the work and only after a given movement of said member has taken place, and adjustment means for varying relatively to each other the spacings between the contact finger and said actuating part and between the gauging contact and the work when the movable member is retracted.

GUSTAF ADOLF BJÖRKLUND.
HILDING VALDEMAR TÖRNEBOHM.